United States Patent [19]

Draege

[11] 3,709,062
[45] Jan. 9, 1973

[54] BELT DRIVE FOR PLURALITY OF SINGLE GROOVE SHEAVES
[75] Inventor: George E. Draege, Oregon, Ill.
[73] Assignee: Hesston Corp., Hesston, Kans.
[22] Filed: Oct. 1, 1971
[21] Appl. No.: 185,747

[52] U.S. Cl. .........................74/722, 74/219, 56/11.6
[51] Int. Cl. ............................................F16h 37/00
[58] Field of Search........74/219, 226, 227, 665, 722; 56/11.6

[56] References Cited

UNITED STATES PATENTS 1,302,222   4/1919   Rivett.....................................74/722
2,872,831   2/1959   Wood..............................74/665 GE Primary Examiner—Milton Kaufman
Assistant Examiner—Frank H. McKenzie
Attorney—Schmidt, Johnson, Hovey & Williams

[57] ABSTRACT

A power transmission in which a plurality of single groove sheaves are driven unidirectionally by a single, continuous belt having but one arc of contact with each sheave respectively. Each of the driven sheaves and an adjacent idler pulley are essentially coplanar thereby presenting a compact transmission requiring minimal operating space. The configuration of the belt is such that there is no more than one-quarter turn in any one stretch of the belt. Structure is provided to preclude contact of those stretches of the belt which cross one another.

8 Claims, 3 Drawing Figures

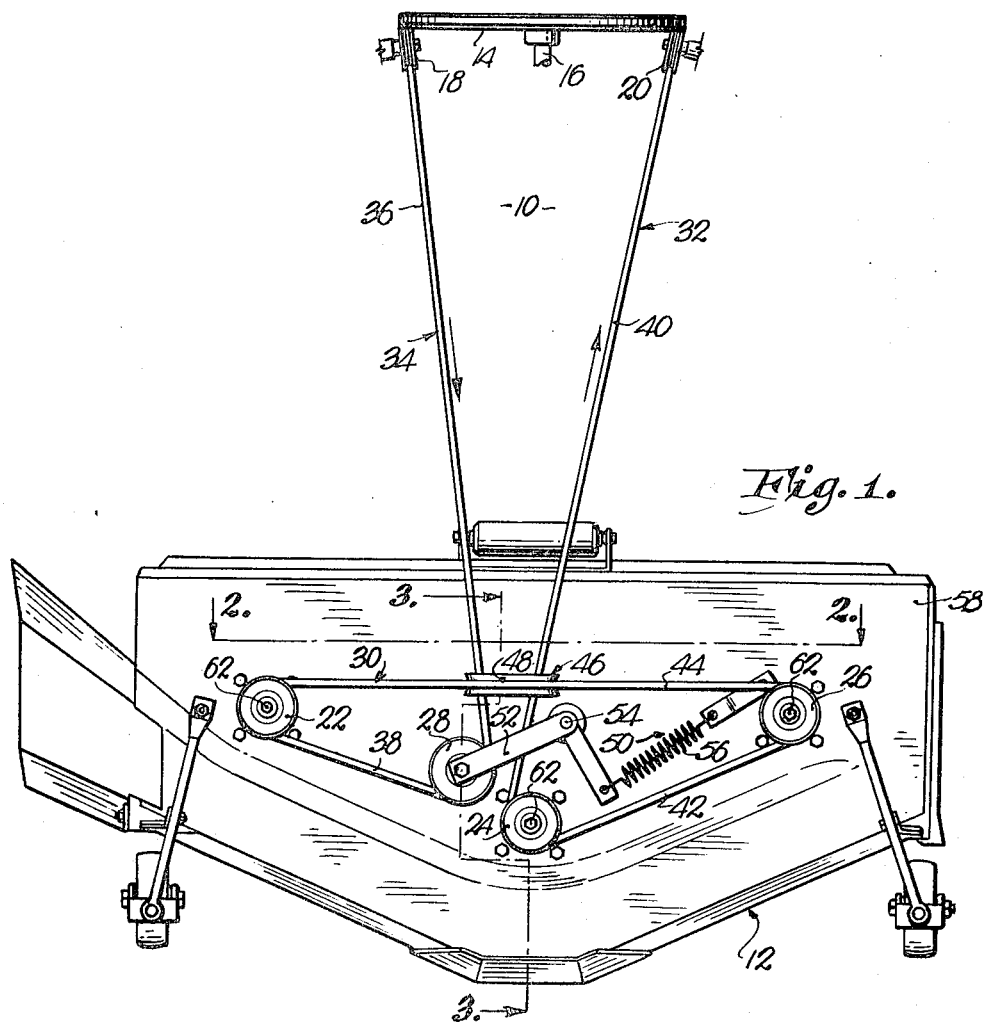
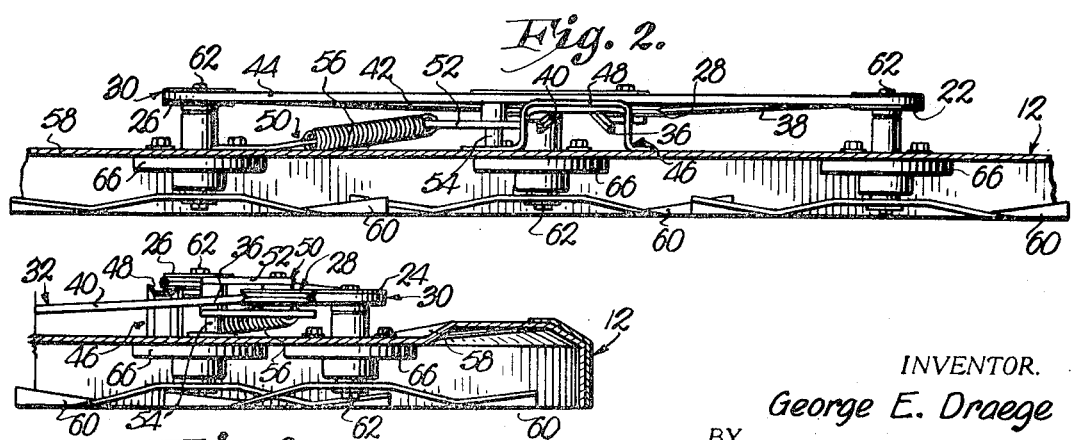
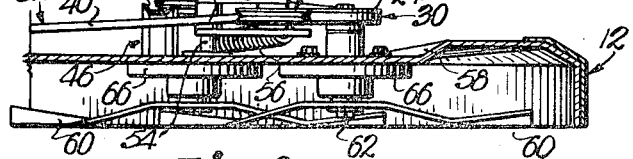
Fig. 1.
Fig. 2.
Fig. 3.
INVENTOR.
George E. Draege
BY
Schmidt, Johnson, Hovey & Williams
ATTORNEYS.

BELT DRIVE FOR PLURALITY OF SINGLE GROOVE SHEAVES

This invention relates to a belt drive for a plurality of single groove sheaves such as might be used in a power transmission for a multiple blade rotary mower of the type commonly used with tractors for mowing roadsides, estate lawns, parks, and the like. One of the major disadvantages of mowers of this type has been the total overall height of the mower resulting from the necessity of using multiple groove sheaves or pulleys in order to obtain the proper directional rotation of each of the blades thereof. The above mentioned drives are located above a deck or shell portion of the mower which overlies the blades. The fact that these mowers are generally mounted beneath the frame of the tractor in an underslung fashion, limits the amount of space or height that is available for the raising and lowering of the mower from an operative to an inoperative, or transport position. The power transmission of the present invention provides additional mentioned, clearance between the mower and the tractor frame, as above mentioned, because of the low profile made possible by the exclusive use of single groove pulleys which are in a coplanar position just above and adjacent the deck of the mower.

The arrangement or configuration of the drive belt which is used to transmit the power from the tractor to the mower as herein disclosed, further minimizes a significant disadvantage of other such mowers in that the belt is not twisted in any one stretch more than 90° or one-quarter turn, whereas in some instances, the belt is required to twist as much as three-quarters turn or 270° which can have a very detrimental effect on the life of such a belt. Furthermore, the belt configuration of the present invention permits the use of tensioning means utilizing a spring-loaded idler pulley to maintain the belt under proper tension at all times. Many of the power transmissions used for this type of mower do not have the space needed to incorporate such a belt-tensioning pulley and must resort to other less desirable methods of keeping the belt under proper tension such as rigidly mounted idler pulleys which must be manually shifted each time the belt is to be properly tensioned. Additionally, it is very advantageous that the tensioning means be located along the return stretch or slack side of the belt to maximize the service life of the belt.

Therefore, it is an important object of this invention to provide a power transmission for a tractor mounted mower that is compact and presents a minimal total overall height.

It is a further important object of my invention to provide a belt-driven power transmission in which the belt twist is restricted to no more than what is considered acceptable under good engineering practice.

It is a still further important object of the present invention to provide a belt take-up or tensioning means which insures maximum belt life.

It is another important object of my invention to provide a belt transmission in which the belt is easily installed or removed without the use of tools and the need to refer to complicated, hard to understand instructions or diagrams.

In the drawing:

FIG. 1 is a plan view of a multiple blade rotary mower having a belt-driven power transmission utilizing a plurality of single groove essentially coplanar driven pulleys;

FIG. 2 is an enlarged, fragmentary, vertical cross-sectional view taken along line 2—2 of FIG. 1; and FIG. 3 is an enlarged, fragmentary, vertical cross-sectional view taken along line 3—3 of FIG. 1.

Referring initially to FIG. 1, a power transmission, broadly denoted by the numeral 10 and adapted to be used in conjunction with a rotary mower 12 or the like, is provided with a drive pulley 14 operably connected to the power output shaft 16 of a tractor or other vehicle (not shown) therebehind. A pair of mule guide pulleys 18 and 20 are horizontally spaced apart adjacent drive pulley 14. A plurality of spaced, single groove, unidirectionally driven sheaves or pulleys, defining a first driven pulley 22, a second driven pulley 24, and a third driven pulley 26, are located on mower 12 in a triangular pattern remote from mule pulleys 18 and 20. Transmission 10 further includes an idler pulley 28 adjacent and substantially coplanar with driven pulleys 22, 24 and 26, located between first driven pulley 22 and second drive pulley 24. The location of drive pulley 14 is such that its axis of rotation is angularly offset relative to the axis of rotation of the driven pulleys 22, 24 and 26 and the idler pulley 28.

A single, continuous belt 30 is trained around pulleys 22, 24 and 26 in such a manner that the belt has but a single arc of contact with each of the above-mentioned pulleys respectively. Belt 30 comprises a tight or working side 32 and a slack or return side 34, each having certain stretches to be further described. The belt 30 herein referred to may be of the kind commonly found on agricultural and industrial equipment and may be of the type known and referred to in the belt industry as a V-belt. Return side 34 includes first stretch 36 extending forwardly beneath the tractor from mule pulley 18 to and around idler pulley 28, and is twisted one-quarter turn for proper orientation with idler pulley 28. A second stretch 38, extending from idler pulley 28 to first drive pulley 22, defines the remaining portion of return side 34 of belt 30.

Working side 32 of belt 30 has a first stretch 40, also provided with a quarter turn for proper orientation with pulley 24, extending forwardly beneath the tractor from the other mule pulley 20 to and around second driven pulley 24. A second stretch 42 extends from second driven pulley 24 to and around the third driven pulley 26, and a third stretch 44 extending further from third driven pulley 26 to and around first driven pulley 22 whereat it joins with stretch 38 of return side 34 of belt 30.

Resilient means in the nature of a spring-tensioned lever arm assembly 50 supports idler pulley 28 at return side 36 for yieldably maintaining belt 30 under tension. Assembly 50 includes a bell crank 52, which carries idler pulley 28, journaled to shaft 54 and is biased to hold idler pulley 28 under tension against belt 30 by a spring 56 attached to deck 58 of mower 12.

Third stretch 44 crosses first stretches 36 and 40 in an essentially horizontal position and is separated at such zone of crossing by a structure 46 which precludes contact of stretch 44 with the aforementioned first stretches 36 and 40. Structure 46 is in a U-shaped configuration bridging over first stretches 36 and 40 and is provided with a bight 48 presenting an upwardly facing guide channel for third stretch 44. Bight 48 is further disposed to limit the extent of sag and downward whip of third stretch 44, as well as limiting the extent of upward whip of stretches 36 and 40 while transmission 10 is in operation. Structure 46 is positioned such that mule pulleys 18 and 20 are located to one side of the structure 46 with the second driven pulley 24 and idler pulley 28 being on the opposite side of structure 46.

Whereas transmission 10 hereinabove described has application to many different apparatuses, it has in this particular embodiment been adapted for use with a rotary mower 12 having a series of rapidly spinning cutting blades 60 each releasably attached to one end of a corresponding series of shafts 62 journaled to deck 58 by bearing assemblies 66. Each of driven pulleys 22, 24 and 26 is releasably affixed above deck 58 to a shaft 62 as is best illustrated in FIG. 2. Mower 12 is positioned transversely to the direction of travel of the vehicle to which it is attached so that blades 60 are horizontally disposed and rotating about a vertical axis. Transmission 10 is correspondingly essentially horizontally disposed, except for drive pulley 14 and mule guide pulleys 18 and 20, as will be readily apparent by viewing FIG. 1.

The belt drive herein described results in a compact, minimal space requiring power transmission which is conducive to increased drive life because it incorporates many of the principles of good belt drive design that heretofore had to be compromised when applied to a drive for a rotary mower or the like. Specifically, room is made available for the proper location of the tensioning assembly 50 with respect to belt 30 as well as permitting use of the type of tightener which best controls belt whip and slippage. Also, belt 30 is kept under proper tension at all times regardless of the variation of loads imposed thereon. Further, the twist in stretches 36 and 40 are limited to a quarter turn and do not significiantly affect belt life as would be the case if the twist were more severe.

Not to be overlooked is the fact that the compact nature of the drive allows more clearance between the carrying vehicle and the mower 12 so that the latter may be raised higher to clear any obstacles that might be encountered. Furthermore, the simplicity of the configuration of the belt 30, precludes the need for complicated, hard to understand installation instructions.

Most belt drives commonly used for driving mowers similar to the one herein referred to, utilize mule guide pulleys 18 and 20 as the only means for tightening belt 30. The repositioning of mule guide pulleys 18 and 20 is just complicated and time-consuming enough that the operator very often neglects to keep the belt 30 properly tensioned, which results in short life due to slippage, whip and possible damage from being thrown off of the pulleys. The use of mule guide pulleys 18 and 20, as the belt take-up means, also makes it impossible to keep belt 30 in proper alignment with drive pulley 14 and to some extent, with driven pulley 24 and idler pulley 28. Furthermore, since this method of tightening the belt 30 is not self-adjusting, it has to be done in such a manner that the tension is set for the most optimum operating position of mower 12. This, of course, means that as the mower 12 is raised or lowered, less than ideal tensioning conditions exist because of the unyielding nature of the mule pulleys 18 and 20. The configuration of the instant transmission 10 allows enough space for the use of the spring-tensioned assembly 50 to support idler pulley 28, thus eliminating the above mentioned disadvantages of using mule guide pulleys 18 and 20 as the belt-tightening means. Occasionally, individual nonyielding idler pulleys have been positioned at other places along belt 30 such as between certain of the drive pulleys. This not only added cost, but presented most of the same alignment and tensioning problems associated with using the mule idler pulleys 18 and 20 as above-mentioned.

The spring-tensioning of idler pulley 28 against belt 30 improves the service life of the latter because it can take up the slack in belt 30 and properly compensate for any shock loads imposed thereon such as the rapid engagement of the transmission 10 or if one of the blades 60 should happen to strike a rigid object. The spring-tensioned idler pulley 28 further maintains belt 30 in proper tension as mower 12 is raised and lowered which causes the distance between drive pulley 14 and mower 12 to change. If mower 12 is raised while it is in operation, this change in distance might cause the belt 30 to become slack and whip which could easily result in the belt 30 being thrown from the pulleys 22–28 and being damaged if idler pulley 28 did not compensate for such slack.

Belt lift is further enchanced by the fact that the idler pulley 28 engages belt 30 along return side 34 which is normally slack as compared with the working side 32, which is commonly referred to as the tight side in which stretches 40, 42 and 44 all pull around pulleys 22, 24 and 26. Very often there is not space on the slack side 34 for a spring-tensioned tightening mechanism such as assembly 50 which is exactly where it should be to best eliminate belt ship. The configuration of the present invention makes this optimum location possible. Structure 46 insures the separation of stretch 44 from stretches 36 and 40 should belt 30, for some reason, jump or sag due to a sudden change in its load, causing lever arm assembly 50 to momentarily reduce the tension thereon.

An important feature incorporated in the present invention is the absolute minimal amount of twist in belt 30. The only twist required is that needed to properly orient the belt with the pulleys 14, 18, 20 and 28 which, in each case, is no more than 90°. Here again, in many drives of this nature, it is common to have as much as a 270° twist in either stretch 36 or 40 in order to have the belt properly oriented with its pulleys. If the belt twist can be made in relatively long stretches, as is the case in the present invention, the detrimental effect of such twist of the belt is greatly minimized. Correspondingly, it is most important that relatively short stretches such as 38, 44 and 42 be free of any twist whatsoever as in the instant invention.

The coplanar relationship of pulleys 22–28 and their related stretches 38, 42 and 44 not only minimizes the total height of the mower 12 as previously pointed out, but also eliminates any alignment problems between the pulleys 22–28 and belt 30. This coplanar relationship permits the belt 30 to approach and enter each of the pulley 22–28 essentially straight-on which is most ideal for maximum belt life.

Multiple blade mowers that are driven with one belt usually have two or more grooves in at least one of the pulleys 22, 24 or 26 which is particularly disadvantageous not only because of the height limitations imposed thereby, but also because of the necessity of multiple contact of the belt. This multiple contact tends to cause unequal application of torque to the driven pulleys 22–26 which, in turn, causes slippage of the belt 30 relative to the same. The single-groove pulleys as used in transmission 10 are so arranged that the arc of contact of belt 30 with each driven pulley 22–26 is substantially the same, so that the torque is applied equally to each pulley 22–26 resulting in a smooth, vibration-free operation. The present belt configuration provides approximately three times as much belt wrap at each driven pulley 22–26 as is usually found in this type of drive with the resultant benefit of having a transmission with superior torque transmitting capability.

The power transmission 10 herein disclosed provides a long life, efficient, relative maintenance-free drive because of the incorporation therein of most well-recognized good design practices. The uncomplicated configuration of the drive permits quick and easy replacement of the belt 30 should this become necessary, and it may be done with simple instructions, such as a decal on the deck 58, so that any unskilled user might readily replace the same without having to refer to a complicated belt diagram or other hard to understand instructions. This configuration further permits installation of the belt 30 without the need for any disassembly of the mower 12 or its drive 10 which precludes the need for any installation tools.

It has been the generally accepted practice or habit to work an area of field in a counterclockwise direction. Most single belt drive multiple rotor mowers require the operator to travel in a clockwise direction because of the left-hand discharge from the blades 60. The arrangement of transmission 10 of the present invention is such that the blades 60 rotate in a clockwise direction making a right-hand discharge possible which permits the standard counterclockwise direction of travel.

Having thus described the invention, what is claimed as new and desired to be secured by Letters Patent is:

1. In a power transmission:
a drive pulley;
a pair of spaced mule mule guide adjacent the drive pulley;
a plurality of spaced, single groove, unidirectional driven pulleys;
an idler pulley adjacent and substantially coplanar with the driven pulleys;
the axis of rotation of the drive pulley being angularly offset relative to the axes of rotation of the driven pulleys and the idler pulley; and
a single continuous belt trained around said pulleys and having but a single arc of contact with each pulley respectively,
said belt having a working side and a return side,
said return side having a first stretch extending from one of the mule pulleys to and around the idler pulley, and a second stretch extending from the idler pulley to a first of said driven pulleys,
said working side having a first stretch extending from the other of said mule pulleys to and around a second of said driven pulleys, a second stretch extending from the second driven pulley to and around a third of said driven pulleys, and a third stretch extending from he third driven pulley to and around said first driven pulley whereat it joins with said second stretch of the return side of the belt.

2. In a power transmission as claimed in claim 1; and resilient means coupled with said idler pulley for yieldably maintaining said return side of the belt under tension.

3. In a power transmission as claimed in claim 1, wherein said driven pulleys are arranged in a triangular pattern and said idler pulley is located between the first and second driven pulleys.

4. In a power transmission as claimed in claim 1, wherein said third stretch crosses said first stretches in spaced relationship thereto.

5. In a power transmission as claimed in claim 4; and structure precluding contact of said third stretch with said first stretches at the zone of crossing.

6. In a power transmission as claimed in claim 5, wherein said third stretch is normally in an essentially horizontal position and passes over said first stretches, said structure being disposed to limit the extent of sag and downward whip of the third stretch and the extent of upward whip of the first stretches.

7. In a power transmission as claimed in claim 4; and a U-shaped structure bridged over said first stretches and provided with a bight having an upwardly facing guide channel for said third stretch to preclude contact of the latter with said first stretches at the zone of crossing, the mule pulleys being on one side of said structure, said second driven pulley and the idler pulley being on the opposite side of said structure.

8. In a power transmission as claimed in claim 1, wherein said first stretches are provided with a quarter turn.

* * * * *